United States Patent
Maron

[11] Patent Number: 6,016,702
[45] Date of Patent: *Jan. 25, 2000

[54] HIGH SENSITIVITY FIBER OPTIC PRESSURE SENSOR FOR USE IN HARSH ENVIRONMENTS

[75] Inventor: Robert J. Maron, Cromwell, Conn.

[73] Assignee: Cidra Corporation, Wallingford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,598

[22] Filed: Sep. 8, 1997

[51] Int. Cl.⁷ .................. G01L 9/00; G01J 1/04; G01J 4/00
[52] U.S. Cl. .................. 73/705; 250/227.14; 250/227.18
[58] Field of Search .................. 73/705, 708, 715, 73/729.1, 152.22, 152.27, 152.51, 800; 385/12, 13; 250/231.19, 227.14, 227.18, 227.21; 356/32, 34

[56] References Cited

U.S. PATENT DOCUMENTS

| | | | |
|---|---|---|---|
| 4,509,370 | 4/1985 | Hirschfeld | 73/705 |
| 4,545,253 | 10/1985 | Avicola | 385/12 |
| 4,577,100 | 3/1986 | Meltz et al. | 250/231.19 |
| 4,589,285 | 5/1986 | Savit | 73/655 |
| 4,649,529 | 3/1987 | Avicola | 385/12 |
| 4,859,844 | 8/1989 | Herman et al. | 250/231.19 |
| 4,900,937 | 2/1990 | Dayton et al. | 250/483.1 |
| 4,932,262 | 6/1990 | Wlodarczyk | 73/705 |
| 4,932,263 | 6/1990 | Wlodarczyk | 73/705 |
| 4,996,419 | 2/1991 | Morey | 250/227.18 |
| 5,012,090 | 4/1991 | Spillman, Jr. | 250/227.21 |
| 5,042,898 | 8/1991 | Morey et al. | 385/37 |
| 5,144,690 | 9/1992 | Domash | 385/12 |
| 5,163,321 | 11/1992 | Perales | 73/718 |
| 5,308,973 | 5/1994 | Odoni et al. | 250/227.17 |
| 5,315,110 | 5/1994 | Smith | 250/227.17 |
| 5,351,324 | 9/1994 | Forman | 385/37 |

(List continued on next page.)

FOREIGN PATENT DOCUMENTS

| | | | |
|---|---|---|---|
| 0210372 | 2/1987 | European Pat. Off. | G01D 5/26 |
| 0227556 | 7/1987 | European Pat. Off. | G01D 5/26 |
| 0404242 | 12/1990 | European Pat. Off. | G01D 5/26 |

OTHER PUBLICATIONS

"High Sensitivity Intrinsic Fiber–Optic Fabry–Perot Pressure Senosr", Optics Letters/vol. 21, No. 8/Apr. 15, 1996, pp. 615–617.

Fiber Grating Pressure Sensor With Enhanced Sensitivity Using a Glass–Bubble Housing, by M. G. Xu, H. Geiger and J.P. Dakin—Electronics Letters, 18$^{th}$ Jan. 1996, vol. 32, No. 2, pp. 128–129.

Primary Examiner—William Oen
Attorney, Agent, or Firm—Ware, Fressola, Van Der Sluys & Adolphson LLP

[57] ABSTRACT

A pressure sensor capable of measuring pressure in a harsh environment includes at least one intrinsic fiber optic sensor element formed within a core of an optical fiber. A length of the optical fiber containing the sensor element is attached to a pressure sensitive structure. A dimension of the pressure sensitive structure changes in response to changes in the pressure of a pressure field of the environment. The sensor element is responsive to all input signal and to a strain caused by changes in the dimension of the pressure sensitive structure for providing a pressure signal indicative of the pressure. A temperature compensation sensor is also formed in the fiber near the location of the pressure sensor. The temperature sensor is isolated from strain associated with the pressure for providing temperature compensation of the pressure sensor. Alternatively, temperature compensation is provided by an intrinsic fiber optic sensor element mounted to experience an equal but opposite strain associated with changes in the dimension of the pressure sensitive structure.

36 Claims, 8 Drawing Sheets

U.S. PATENT DOCUMENTS

| | | | |
|---|---|---|---|
| 5,357,806 | 10/1994 | Dennis et al. | 73/718 |
| 5,363,463 | 11/1994 | Kleinerman | 385/123 |
| 5,399,854 | 3/1995 | Dunphy et al. | 250/227.17 |
| 5,401,956 | 3/1995 | Dunphy et al. | 250/227.18 |
| 5,414,507 | 5/1995 | Herman et al. | 250/227.21 |
| 5,444,803 | 8/1995 | Kim et al. | 385/28 |
| 5,452,087 | 9/1995 | Taylor et al. | 356/352 |
| 5,485,745 | 1/1996 | Rademaker et al. | 73/151 |
| 5,495,237 | 2/1996 | Yuasa et al. | 340/854.6 |
| 5,499,533 | 3/1996 | Miller et al. | 73/152 |
| 5,548,116 | 8/1996 | Pandelisev | 250/256 |
| 5,633,748 | 5/1997 | Perez et al. | 250/227.18 |
| 5,646,401 | 7/1997 | Udd | 250/227.18 |
| 5,680,489 | 10/1997 | Kersey | 385/12 |
| 5,684,297 | 11/1997 | Tardy | 250/227.14 |
| 5,767,411 | 6/1998 | Maron | 73/705 |
| 5,808,779 | 9/1998 | Weis | 385/12 |

HIGH SENSITIVITY FIBER OPTIC PRESSURE SENSOR FOR USE IN HARSH ENVIRONMENTS

TECHNICAL FIELD

The present invention relates to optical sensors, and more particularly, to intrinsic fiber optic pressure sensors packaged for use in extremely harsh environments.

BACKGROUND OF INVENTION

In the extraction of oil from earth boreholes, the naturally existing pressure within an earth formation is often used as the driving force for oil extraction. The oil may be extracted from a single location or "zone" within the well, or oil may be extracted from multiple zones within the well. In either case, it is desirable to know the fluid pressure within the well at multiple locations to aid the well operator in maximizing the depletion of the oil within the earth formation.

It is often required to provide some form of artificial pumping power to force the oil being extracted up the borehole to the surface where it can be collected. In such producing wells, electrically powered pumps located at the bottom of the wells are typically employed. Such devices, called electrical submersible pumps (ESPs), are typically installed after the well has been drilled and while it is being put into production. ESPs are located at the bottom end of a long length of tubing, called the production tubing string, and are powered by electrical cables deployed from the surface.

It is known to install electrical pressure and temperature sensors with some ESPs to provide the operator on the surface with information about the pump's performance. The collected information then allows the operator to control various parameters, such as pump speed, which can increase the life of the pump. Increasing the pump life until a scheduled maintenance, when other scheduled downhole work can be accomplished at the same time, is highly desirable since it minimizes costs due to lost oil production.

The presently used electrical pressure and temperature sensors are limited for several reasons. The on-board electronics of such sensors must operate in a very hostile environment, which includes high temperature, high vibration and high levels of external hydrostatic pressure. Such electrical sensors also must be extremely reliable, since early failure may entail a very time consuming and expensive well intervention. Electronics, with its inherent complexity, are prone to many different modes of failure. Such failures have traditionally caused a less than acceptable level of reliability when these electrical sensors are used to monitor ESPs.

There are numerous other problems associated with the transmission of electrical signals within wellbores. In general, there are problems encountered in providing an insulated electrical conductor for transmitting electrical signals within wellbores. Such electrical conductors must be sealed against exposure to wellbore fluids, which are at high temperatures, high pressures, and present a very corrosive environment. Such electrical conductors, once damaged by the fluids which penetrate the insulating materials around the electrical conductors, will typically short electrical signals. Additionally, electrical transmissions are subject to electrical noises in some production operations.

It is also known to use optical interferometers for the measurement of wellbore conditions, such as downhole wellbore pressures and temperatures. However, optical interferometers are typically very sensitive to temperature variations and the downhole temperature of a specific position within a wellbore will change over time, depending upon different factors such as, for example, production rates, the types of fluids produced over the life of the well, and downhole wellbore conditions. Even optical interferometers designed of special material or construction are subject to inaccuracies because of the harsh borehole environment and because of the very tight tolerances in such precision equipment. Additionally, such optical interferometers are located at the end of an optical fiber and are only useful for making a single measurement at the point within the system the sensor is located.

Therefore, a reliable system is needed for accurately measuring the pressure of a harsh environment, such as a borehole. Additionally, such a system should be capable of measuring pressure at multiple locations within the harsh environment

SUMMARY OF THE INVENTION

An object of the present invention is to provide an improved pressure sensor for accurately monitoring pressure in an extremely harsh environment.

A further object of the invention is to provide such a sensor which is particularly useful for accurately monitoring pressure at multiple locations within a wellbore of an oil and/or gas well.

A still further object of the present invention is to provide such a sensor that is implemented utilizing intrinsic fiber optic sensors.

According to the present invention, a pressure sensor capable of measuring pressure in a harsh environment includes at least one intrinsic fiber optic sensor elements formed within a core of an optical fiber, a length of the optical fiber containing the sensor element is attached to a pressure sensitive structure and the pressure sensitive structure is responsive to pressure in a pressure field of the harsh environment such that changes in the pressure sensitive structure in response to changes in the pressure of the pressure field changes the strain in the length of optical fiber containing the sensor element.

In further accord with the present invention, the optical fiber may be disposed within a capillary tube made of a high strength, corrosion resistant material, such as stainless steel, which is highly resistant to corrosion, pressure, and temperature effects of a high-pressure, high-temperature and corrosive environment. One or more sensors are located at a distal end of the capillary tube, and are positioned in desired sensing locations.

In still further accord with the invention, each sensor element may include a Bragg grating sensing element, such as a Bragg grating point sensor, a resonant cavity formed with multiple Bragg gratings, or a lasing element formed with multiple Bragg gratings. The Bragg grating sensor elements are responsive to an optical signal and to a strain induced by the pressure sensitive structure, the strain being associated with the respective pressure field, for providing an optical sensing signal related to a magnitude of the pressure at the sensor location within the respective pressure field.

In further accord with the present invention, the Bragg grating sensors may be mounted for either compression or tension associated with pressure within the pressure field. The change in strain in the Bragg grating associated with either compression or tension causes a change in grating spacing thus changing the wavelength of light reflected back to a proximal end of the fiber which is interconnected to a sensing device, and the variations in wavelength are directly related to pressure at the sensing location. The length of fiber may be mounted under an initial tension, which is increased or decreased, as the case may be, associated with the pressure in the environment being sensed.

According further to the present invention, each sensor may be provided with a temperature compensation Bragg grating to compensate for changes in temperature at the sensing location. The temperature compensation Bragg grating may be mounted such that it is isolated from strain associated with pressure in the environment. Alternatively, the temperature compensation Bragg grating may be mounted to also be responsive to the pressure of the pressure field (either directly or inversely to the other Bragg grating).

According still further to the invention, the pressure sensor of the invention may be used to monitor static and/or dynamic pressure variations.

According further to the invention, a plurality of pressure sensors manufactured in accordance with the invention may be serially connected to one another for pressure detection at multiple locations. The serial connected sensors may employ time division multiplexing (TDM) and/or wavelength division multiplexing (WDM) techniques to differentiate between signals from the different serially connected sensors.

The development of intrinsic fiber optic sensors which utilize strain-sensitive intracore Bragg gratings offers the possibility of constructing very small, rugged, and reliable sensors. Such sensors can be made very small in size, which allows several to fit within a confined space. Their intrinsic sensing capability, which requires no failure-prone downhole electronics, also provides an extremely high level of reliability that far surpasses conventional electrical sensors. An additional advantage of Bragg gratings is that the sensed information is wavelength encoded, which makes them relatively insensitive to variations in the light intensity caused by light source degradation over time, and losses in connectors, etc. Wavelength encoding also enables several sensors to be easily multiplexed along the same optical fiber, using for example the techniques of wavelength division multiplexing (WDM) and/or time division multiplexing (TDM). Such sensors are suitable for use in very hostile and remote environments, such as found in earth boreholes from which oil or gas is being extracted.

The foregoing and other objects, features and advantages of the present invention will become more apparent in light of the following detailed description of exemplary embodiments thereof, as illustrated in the accompanying drawings.

DETAILED DESCRIPTION OF THE INVENTION

The present invention utilizes fiber optic sensors for measuring fluid pressure (static and/or dynamic). In particular, the pressure sensors of the present invention utilize resonant structures, called Bragg gratings, that are disposed at one or more locations within the waveguiding core of an optical fiber.

Figure 1:
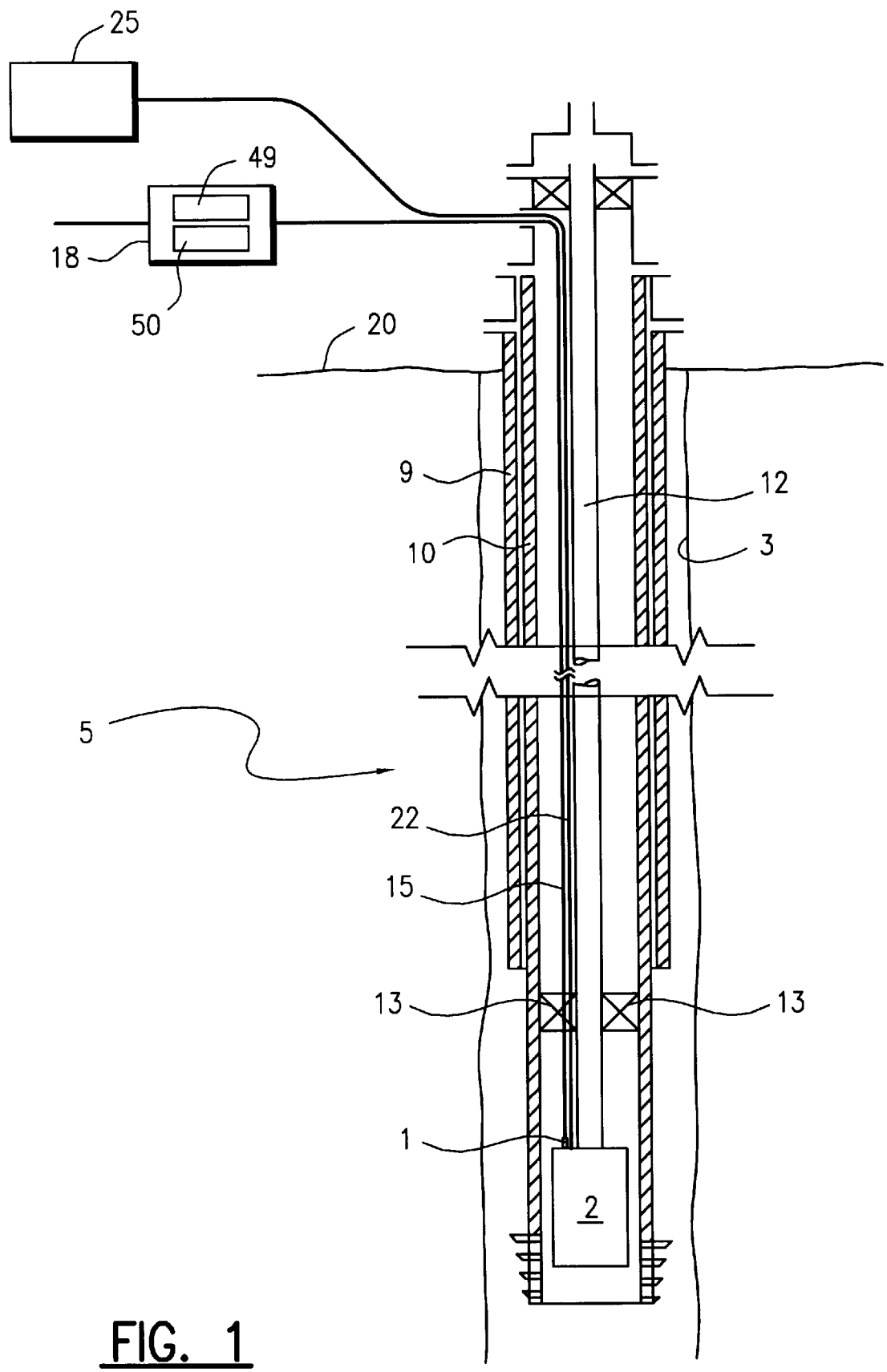
FIG. 1 is a longitudinal cross-sectional view of a wellbore that schematically illustrates a fiber optic intrinsic sensor of the invention interconnected to an electrically submersible pump.

Referring now to FIG. 1, the intrinsic fiber optic sensor elements utilized in accordance with the invention are disposed in a sensor 1 which is mounted in a mounting location, such as to the casing, of an electrically submersible pump 2 within a wellbore 3 of an oil and/or gas well 5. For purposes of describing the pressure sensors 1 of the invention, a single pressure sensor will be described with respect to a first embodiment of the invention. However, as described in greater detail herein, multiple pressure sensors of the invention may be serially multiplexed for distributed pressure sensing using wavelength division multiplexing (WDM) and/or time division multiplexing (TDM) techniques.

Within the wellbore 3 are casing strings 9, 10, production tubing 12, and production packers 13. The pressure sensor 1 is interconnected by an optical fiber assembly 15 with optical signal processing equipment 18. The optical signal processing equipment 18 is located above the surface 20 of the wellbore 3. The electrical submersible pump 2 is interconnected by an electrical cable 22 to an electrical submersible pump power supply and controller 25, which is also located above the surface 20 of the wellbore 3.

Figure 2:
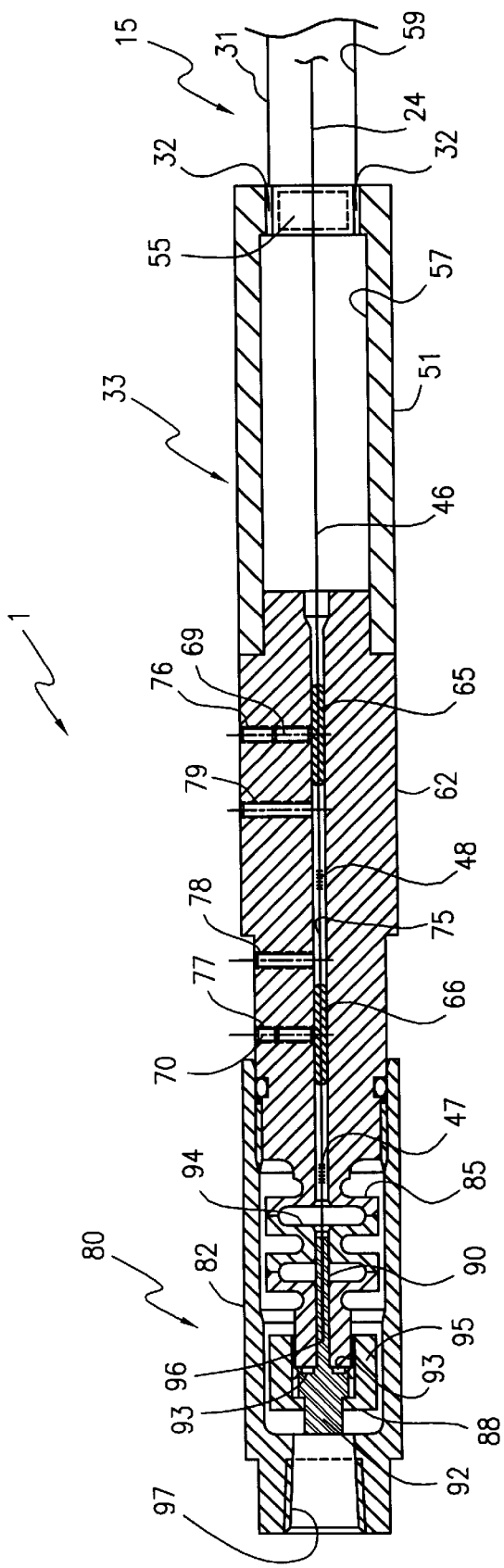
FIG. 2 is a more detailed schematic block diagram of the fiber optic intrinsic sensor of FIG. 1.

Referring now to FIG. 2, the optical fiber assembly 15 includes an optical fiber 24 which may be protected from mechanical damage by placing it inside a capillary tube 31 made of a high strength, rigid walled, corrosion-resistant material, such as stainless steel. The tube 31 is attached by appropriate means, such as threads at 32, a weld, or other suitable method, to a sensor housing 33. The sensor housing 33 may be mounted to the casing of the ESP 2(FIG. 1). Alternatively, the sensor housing 33 may be mounted in another location where it is desired to make a pressure measurement, such as any location along the length of the production tubing 12. The optical fiber 24 extends from the surface 20 (FIG. 1) of the well and contains a light guiding core which guides light along the fiber 24. Within the sensor housing 33 is a length of optical fiber 46 containing Bragg gratings 47, 48. The Bragg gratings 47, 48 each act as a resonant cavity and as a sensor. The Bragg grating 47, 48 are constructed to reflect a particular wavelength or frequency of light that is propagating along the fiber core, back in the direction of the light source from which it was launched. The particular frequency of light reflected by each Bragg grating 47, 48 is uniquely determined by the Bragg grating spacing. Referring also to FIG. 1, excitation light may be provided by a broadband light source 49, such as a light emitting diode (LED) located within the optical signal processing equipment 18. As discussed in greater detail below, the Bragg gratings 47, 48 are used to implement the pressure sensor of the invention.

The sensor housing 33 includes a first section 51 wherein the optical fiber 24 is introduced into the housing 33 from the capillary tube 31. A pressure seal 55 (shown in phantom) may be positioned at the end of the first section 51 between the housing 33 and the capillary tube 31 to isolate the internal compartment 57 of the housing 33 from the internal compartment 59 of the capillary tube 31. The pressure seal 55 may include a ferrule or other suitable device, and the optical fiber may be sealed to the pressure seal 55 by a suitable adhesion method such as an adhesive compound, mechanical attachment (shrink or press fit), welding or soldering of a metal coated fiber to a metallic rigid member, fused-silica bond agent etc.

Within the housing 33, the length of fiber 46 next passes into a temperature compensation section 62. Within the temperature compensation section, a pair of ferrules 65,66 is mounted to the optical fiber 24 in spaced relation to one another. The ferrules 65,66 are attached to the fiber 46 by any suitable adhesion method, such as the adhesion methods described with respect to the pressure seal 55. The ferrules 65,66 are aligned and secured in place with setscrews 69,70, respectively, in the temperature compensation section 62. In particular, the positions of the ferrules 65,66 are fixed within a channel 75 formed within the temperature compensation section 62 by the setscrews 69,70. In the length of optical fiber positioned between the ferrules 65,66 is the temperature compensation Bragg grating 48. The set screws 69,70 and ferrules 65,75 may be positioned and adjusted to place the length of optical fiber 46 containing the temperature compensation Bragg grating 48 under an initial neutral strain, a tensile pre-strain, or in compression, as desired. Alternatively the fiber may be secure to always be in a slack condition so as not to see any mechanical strain. The setscrews 69,70 are illustrated as being received in spaced apart apertures 76,77 formed in the temperature compensation section 62. Additional apertures 78,79 may be provided in the temperature compensation section 62 for varying the location of the setscrews for contacting the ferrule 65,66. Although the invention is described herein as using setscrews 69,70 to isolate the temperature compensation Bragg grating from pressure strain, any other suitable method of attachment for purposes of isolation may be used.

Once the temperature compensation section 62 is assembled and the ferrules 65,66 are secured in the desired position by the set screws 69,70, the set screws are sealed, for example, by placing a hitch temperature epoxy or weld over the top of the set screws 69,70. Additionally, if additional apertures 78,79 are provided for varying the location of the set screws 69,70, these apertures 78,79 are sealed against environmental pressure, for example, by inserting set screws and sealing the top of the set screws with high temperature epoxy, welding, or any other suitable sealing method.

The fiber 24 exits the temperature compensation section 62 via the channel 75 and enters a pressure monitoring, section 80. The pressure monitoring section 80 includes a sealed housing section 82, a pressure responsive multi-element bellows structure 85 and a fiber mounting section 88. The optical fiber 24 passes through the multi-element bellows structure 85 and is attached to a ferrule 90 by any of the above mentioned suitable adhesion methods. The ferrule 90 is located at the end of a ferrule support 92. The ferrule support 92 and ferrule 90 are part of the fiber mounting section 88. A seal, 93 such as an O-ring, is positioned between the ferrule support 92 and the end of the multi-element bellows structure 85 to thereby seal the internals 94 of the bellows structure from environmental pressure. Alternatively, the ferrule support 92 may be attached to the end of the bellows structure 85 by welding, high temperature epoxy, or other suitable method. An end cap 95, which also forms part of the fiber mounting, structure 88, is placed over the ferrule support 92. The end cap 95 is mounted to the ferrule support 92 and the end of the multi-element bellows structure 85 to thereby securely seal the end of the bellows such that the internals 94 of the bellows is not subject to environmental pressure. The length of optical fiber positioned between the ferrule 90 attached to the multi-element bellows structure 85 and the ferrule 66 in the end of the temperature compensation section 62 contains the pressure monitoring Bragg grating 47. The pressure monitoring Bragg grating 47 is approximately centered between the two ferrules 90,66. In the embodiment of the invention illustrated in FIG. 2, the pressure sensing Bragg grating 47 is placed under initial tensile strain. However, the Bragg grating may be placed under a neutral strain or in compression if desired in accordance with the present invention.

The pressure sensor illustrated in FIG. 2 is a single point pressure sensor with the optical fiber 24 terminated within the ferrule 90. The distal end 96 of the fiber 24 within the ferrule 90 is terminated in an anti-reflective manner to prevent interference with the reflective wavelengths from the Bragg gratings 47,48. For example, the distal end 96 of the fiber may be cleaved at an angle so that the end face is not perpendicular to the fiber axis. Alternatively, the distal end 96 of the fiber may be coated with a material that matches the index of refraction of the fiber, thus permitting light to exit the fiber without back reflection, and be subsequently dispersed in the index-matching material.

In the example of FIG. 2, the pressure sensor 1 is a single point pressure sensor. The end of the pressure sensing section 80 of the housing 33 is open at 97 and is therefore exposed to environmental pressure. A change in the pressure in the environment causes changes in the elongation and the compression of the multi-element bellows structure 85. Variations in the deflections of the multi-element bellows structure 85 causes changes in the strain of the pressure sensing Bragg grating 47. As will be described in greater detail below, these changes in strain in the pressure sensing optical fiber Bragg grating 47 are directly related to the pressure in the environment and are used providing a pressure signal indicative of the pressure in the environment.

Figure 3:
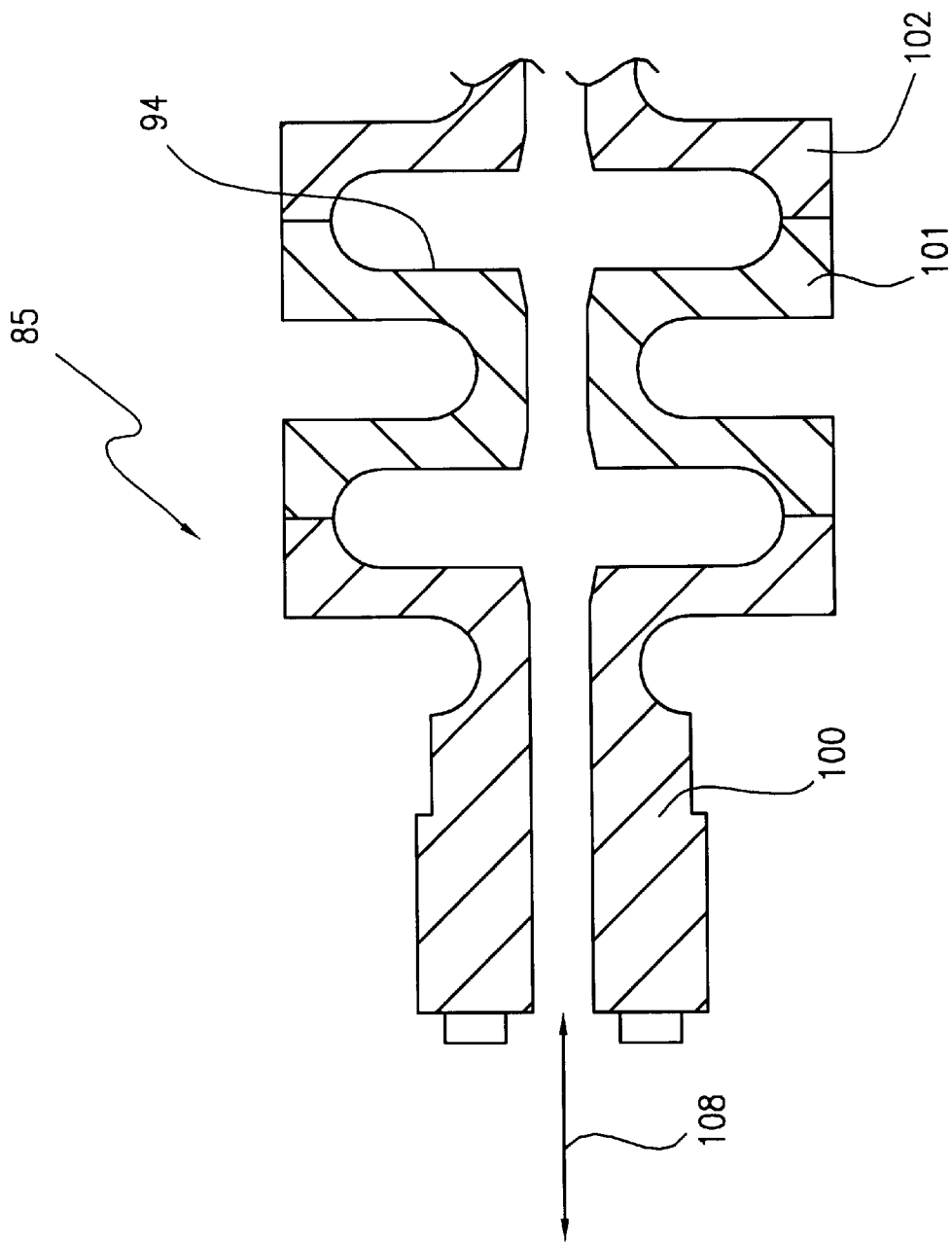
FIG. 3 is a cross-sectional view of a multi-element bellows structure used in the fiber optic intrinsic sensor of FIG. 2.

The multi-element bellows structure 85 is shown in greater detail in FIG. 3. Referring to FIG. 3, the bellows structure 85 includes several diaphragm elements 100,101, 102, which are interconnected to one another to form the multi-element bellows structure 85. In the example of the present invention, the bellows structure is made of a high strength, high temperature, and resiliently deformable material that may be easily machined, molded or formed, e.g., hydro-forming to the desired configuration. For example, the elements 100,101,102 may be made of a machined titanium material. The bellows structure 85 is configured such that when the internal compartment 94 is sealed against external environmental pressure, for example as is accomplished in the pressure sensor configuration of FIG. 2, the bellows structure will expand and contract in an axial direction as illustrated by the line 108. This expansion and contraction is translated directly to the portion of the optical fiber containing the pressure sensing Bragg grating 47.

In the example of the present invention, if the bellows structure is made from a high strength resiliently deformable material such as titanium, the material will need to be machined in order to arrive at the desired shape and therefore, the bellows is made in the several elements 100,101,102 as illustrated in FIG. 3 for ease of machining. These elements 100,101,102 ar then welded together. However, if the bellows structure is made of material which can be formed by die cast molding, for example, then the bellows structure can be made into a single unit and not require individual elements.

By providing multiple bellows interconnected to each other as illustrated in FIG. 3, the sensitivity of the bellows structure 85 to changes in pressure in the environment is enhanced. That is, for a given pressure change in the environment, the change in axial length of the bellows structure is greater for each additional bellows segment of the overall bellows structure. Although only three bellows flexure elements are shown interconnected to one another in FIG. 3, any number of bellows elements may be used to form the bellows structure 85 of the invention, depending on the desired degree of sensitivity of the element. Additionally, although the invention is illustrated as using a bellows for transmitting the pressure of the environment to change the strain in the optical fiber, various methods and structures of pressure translation can be utilized, for example, by utilizing a diaphragm such as the diaphragm illustrated in commonly owned copending patent application Ser. No. 08/786,704 filed on Jan. 21, 1997, the disclosure of which is incorporated herein by reference.

Referring also to FIG. 1, connected between the optical fiber assembly 15 and the optical signal processing equipment 18 may be tubing delivery equipment (not shown) for delivering the optical fiber 24 within the capillary tubing 31 down the borehole 3. The tubing delivery equipment provides for the delivery of the capillary tubing 31 and fiber 24 down the borehole 3, and for the delivery of optical signals between the optical signal processing equipment 18 and the fiber assembly 15, either directly or via interface equipment (not shown) as required.

Bragg gratings (fiber gratings) are well suited for use as sensor elements. When a fiber grating is illuminated, it reflects a narrow band of light at a specified wavelength. However, a measurand, such as strain induced by pressure or temperature, will induce a change in the fiber grating spacing, which changes the wavelength of the light it reflects. The value (magnitude) of the measurand is directly related to the wavelength reflected by the fiber grating and can be determined by detecting the wavelength of the reflected light.

The optical signal processing equipment 18 includes, at a minimum, the broadband source of light 49, such as the light emitting diode (LED), and appropriate equipment for delivery of signal light to the Bragg gratings 47,48 included within the core of the optical fiber 24. Additionally, the optical signal processing equipment 18 includes appropriate optical signal analysis equipment 50 for analyzing the return signals from the Bragg gratings 47,48.

Figure 4:
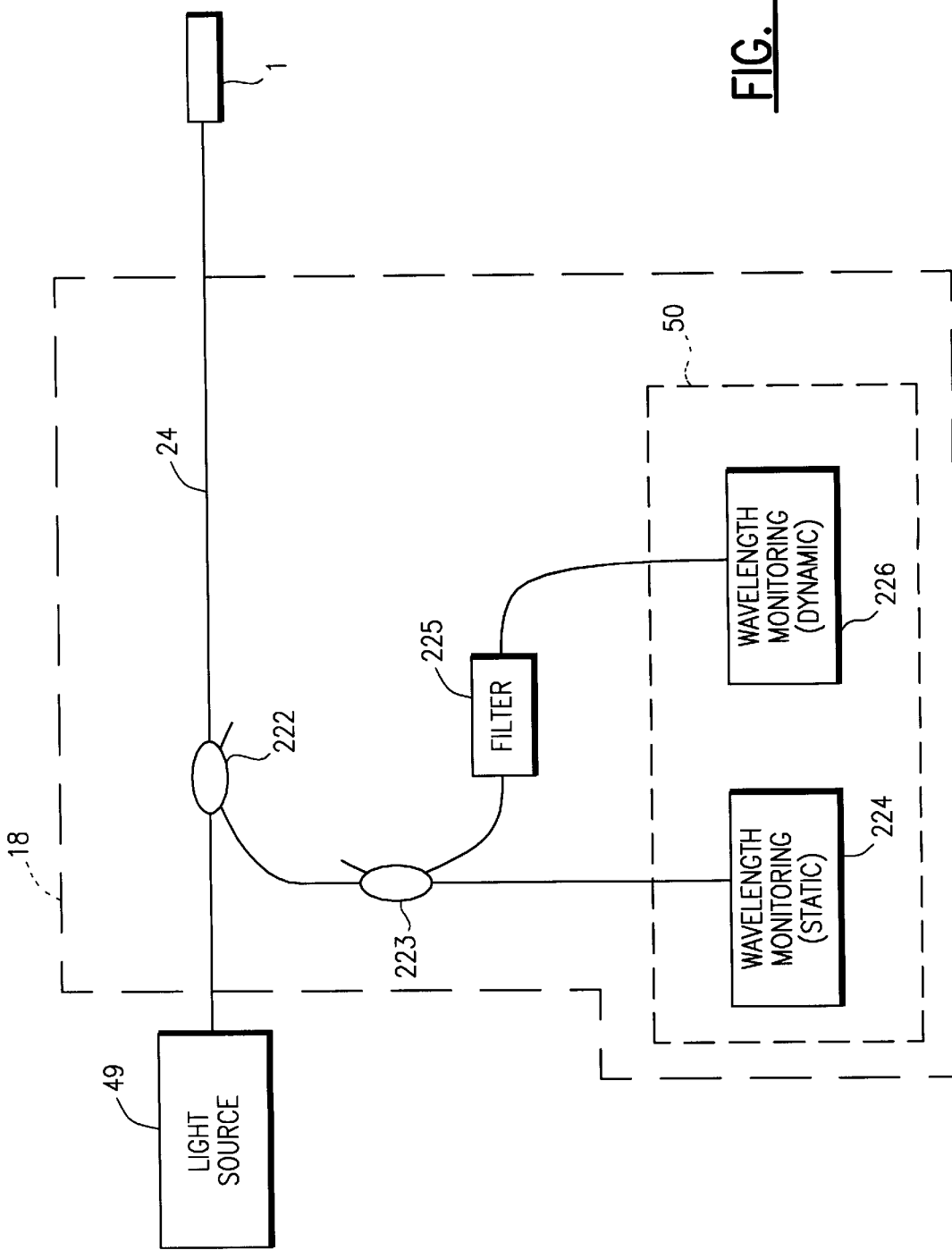
FIG. 4 is a schematic block diagram of optical signal processing equipment utilized to analyze optical signals provided by the fiber optic intrinsic sensor of FIGS. 1 and 2.

FIG. 4 shows an arrangement for monitoring the wavelength shifts produced by the Bragg gratings 47, 48 to provide both static and dynamic pressure sensing. Additionally, the arrangement may also be used for monitoring wavelength shifts in a temperature measuring/ compensation Bragg grating.

Light from the broadband optical source 49 is coupled to the fiber 24 via a coupler 222. This coupler 222 directs light to the sensor assembly 1, and directs the reflected optical components from the Bragg gratings 47, 48 to the optical signal analysis equipment 50 including wavelength monitoring sub-systems, 224 and 226. One of the wavelength monitoring systems 224 allows for the detection of wavelength shifts of the Bragg grating elements using an 'absolute' approach for static parameter monitoring (e.g. pressure & temperature). The other wavelength monitoring system 226 provides for detecting weak dynamically induced shifts for dynamic pressure monitoring.

In order to monitor static wavelength shifts, the returned optical components are directed into an optical wavelength analyzer 224, such as a scanning narrowband filter, which produces a measure of the Bragg wavelength of the signal light reflected by the Bragg gratings 47,48. Static pressure can be deduced from the differential shift of the Bragg wavelengths produced by Bragg gratings 47,48. Temperature may be determined directly from a measure of the Bragg wavelength of the temperature compensation Bragg grating.

A portion of the returned optical components is split off, using a coupler 223, to an alternative wavelength discriminator 226 to thereby provide high resolution monitoring of wavelength shifts. If multiple gratings are used, in order to separate the responses of the different gratings, a portion of the returned optical components from the gratings are directed to a wavelength filter or router 225. This device separates the optical signals produced by each Bragg grating by means of selective filtering. The pass-bands of this device are wide enough to ensure that under normal operating conditions (full temperature & pressure range), the optical signal produced by a particular grating or gratings is always passed. The outputs of the router can then be analyzed using sensitive wavelength discriminators 226 to determine wavelength modulation effects due to dynamic pressure, associated for example with acoustic or seismic information. By tuning the filter 225 passband, the separate gratings in the system can be analyzed individually. Alternatively, a wavelength division demultiplexer could be used to separate the wavelength components onto separate fibers that could then be each analyzed via separate high-resolution wavelength discriminators. An example of the type of wavelength discriminators suitable for this purpose is the interferometric detection approach described in U.S. Pat. No. 5,361,130, the disclosure of which is incorporated herein by reference.

Although a specific embodiment of the optical signal analysis equipment 50 is described above, other optical signal analysis techniques may be used with the present invention such as the necessary hardware and software to implement the optical signal diagnostic equipment disclosed in U.S. Pat. Nos. 4,996,419; 5,401,956; 5,426,297; and/or 5,493,390, the disclosures of which are incorporated herein by reference.

As is well known in the art, various optical signal analysis approaches may be utilized to analyze return signals from Bragg gratings. These approaches may be generally classified in the following four categories:

1. Direct spectroscopy utilizing conventional dispersive elements such as line gratings, prisms, etc., and a linear array of photo detector elements or a CCD array;
2. Passive optical filtering using both optics or a fiber device with wavelength-dependent transfer function, such as a WDM coupler;
3. Tracking using a tuneable filter such as, for example, a scanning Fabry-Perot filter, an acousto-optic filter such as the filter described in the above referenced U.S. Pat. No. 5,493,390, or fiber Bragg grating based filters; and
4. Interferometric detection.

The particular technique utilized will vary, and will depend on the Bragg wavelength shift magnitude (which depends on the sensor design) and the frequency range of the measurand to be detected.

As will be further understood by those skilled in the art, the optical signal processing equipment may operate on a principle of wave-division multiplexing as described above wherein each Bragg grating sensor is utilized at a different passband or frequency band of interest. Alternatively, the present invention may utilize time-division multiplexing for obtaining signals from multiple independent sensors, or any other suitable means for analyzing signals returned from a plurality of Bragg grating sensors formed in a fiber optic sensor string.

The operation of the invention is best understood by example. Referring to FIGS. 1 and 2, an input optical signal, such as a broadband optical signal, is provided by the broadband light source 49 to the optical fiber 24. The optical signal travels along the optical fiber 24 to the sensor 1. Within the sensor 1, the broadband light encounters the temperature sensing Bragg grating 48. As discussed above, each Bragg grating sensor is periodic refractive index variation in the core of an optical fiber that reflects a narrow wavelength of light, has a maximum reflectivity at a central reflectivity wavelength, and transmits all other wavelengths. Thus, when the broadband light source signal is incident on the first (temperature sensing) Bragg grating sensor 48, a narrow wavelength band of light having a central wavelength $\lambda_T$ is reflected therefrom, and light not reflected is transmitted through the grating 48 to the pressure sensing Bragg grating 47. The temperature sensing Bragg grating 47 reflects a narrow wavelength band of light having a central wavelength of $\lambda_p$. Light not reflected by the pressure sensing Bragg grating 47 is provided to the end of the optical fiber and is dispersed.

Figure 5:
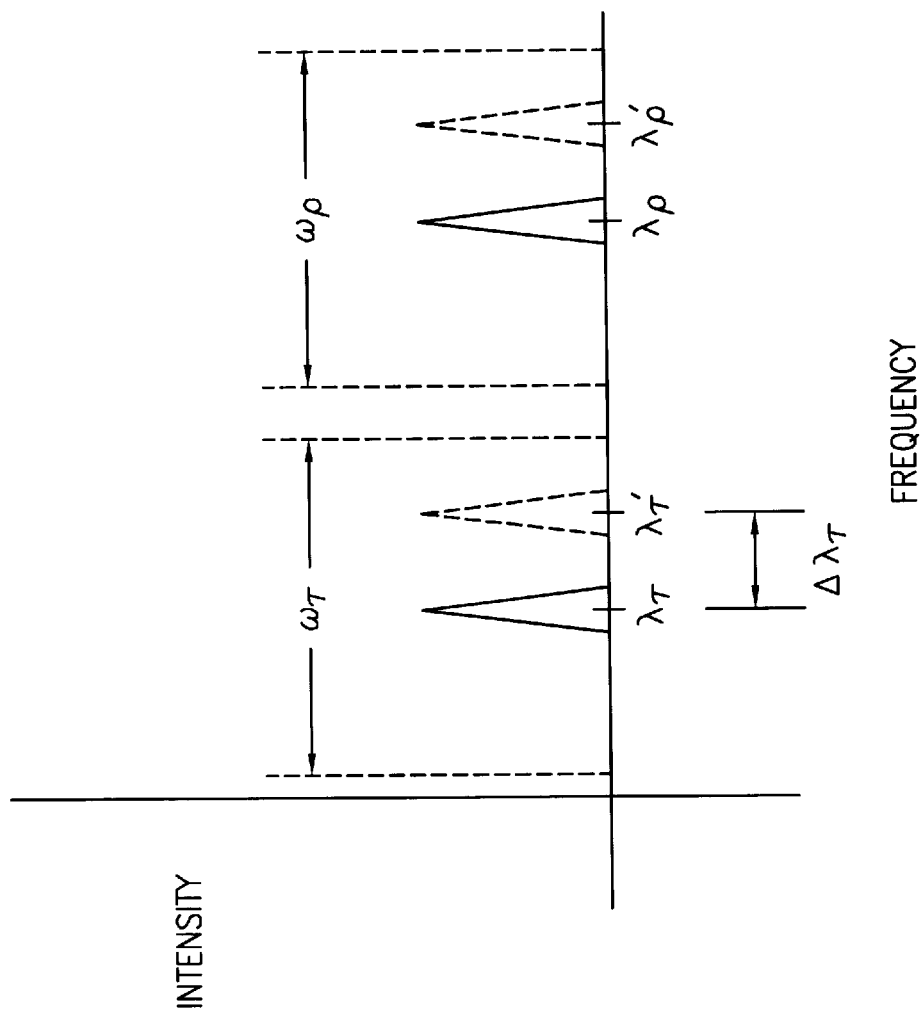
FIG. 5 is a graph showing the reflectivity profile of pressure and temperature Bragg gratings used in the fiber optic intrinsic sensor of FIGS. 1 and 2.

The temperature sensing Bragg grating 48 will experience wavelength change (associated by change in strain) due to changes in temperature. Similarly, the pressure sensing Bragg grating 47 will experience strain due to both changes in temperature and changes in the elongation of the bellows structure 85 (FIG. 2) associated with changes in the pressure in the environment. These strains will cause a wavelength shift in the central wavelength of the narrow band of light reflected by each Bragg grating sensor. For example, referring to FIG. 5, when the temperature sensing Bragg grating 48 is subject to a temperature strain, the central wavelength of reflected light $\lambda_T$ shifts by an amount $\Delta_{\lambda_T}$ to a new central wavelength $\lambda_T$. Typically, the Bragg grating sensors 47,48 are designed to provide a wavelength spacing such that when the central wavelength of one of the Bragg grating sensors shifts by a maximum amount, the central wavelength will still be in a desire bandwidth $\omega$ which does not overlap with the bandwidth of any other Bragg grating sensor.

Both of the Bragg grating sensors 47,48 are subject to the temperature of the environment, while only the pressure sensing Bragg grating 47 is subject to a change in strain associated with the pressure in the environment. Therefore, the temperature sensing Bragg grating 48 can be used to provide both a direct measurement of the temperature at the sensing location and to compensate for the wavelength shift in the pressure sensing Bragg grating 47 associated with temperature. Therefore, an accurate pressure measurement is provided. As will be understood by those skilled in the art, if it is desired to only instantaneous dynamic pressure, then temperature compensation is not required.

Figure 6:
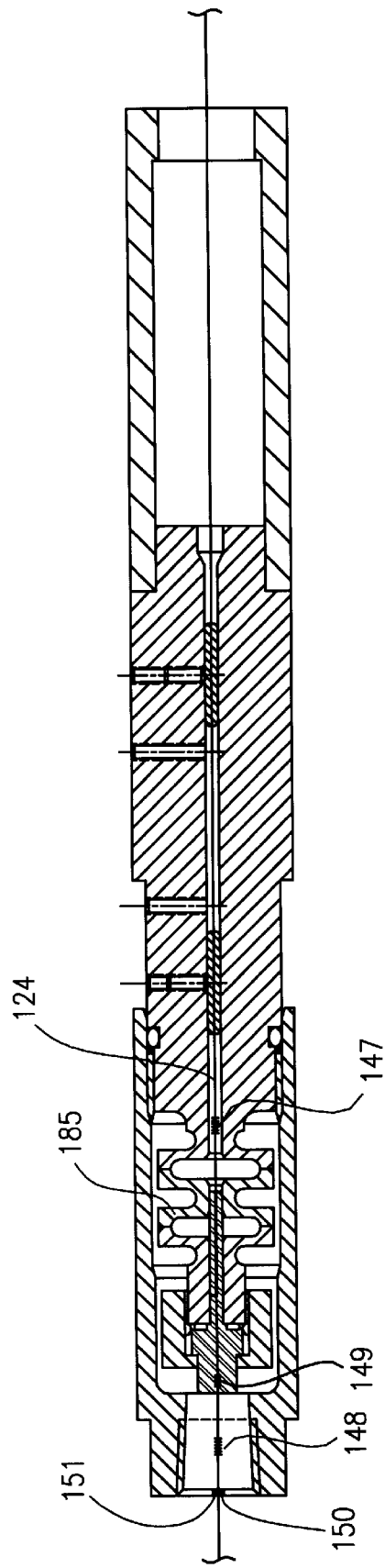
FIG. 6 is a schematic block diagram of a second embodiment of the fiber optic intrinsic sensor of FIG. 1.

The invention is described with respect to FIG. 2 as providing a temperature compensation Bragg grating 48 which is isolated from pressure strain so that it is only responsive to temperature chances. Referring to FIG. 6, in a second embodiment of the invention, the temperature compensation Bragg grating may be made to be inversely responsive to pressure strain. A pressure sensing Bragg grating 147 is positioned within a bellows structure 185, in a similar manner as described with respect to the pressure sensing Bragg grating 47 of FIG. 2. A second, temperature compensation Bragg grating 148 is formed in the fiber 124 and is attached at an attachment point 149 to the bellows structure 185 on the opposite side as the pressure sensing Bragg grating 147. A portion of the fiber 150 on the side of the Bragg grating 148 opposite the mounting location 150 is fixed at a fixed reference location 151. The position of the fixed reference location 151 does not change with changes in pressure of the environment. As will be understood by those skilled in the art, the bellows structure must remain in communication with the environment in which pressure is sensed. Therefore, either the pressure reaches the bellows structure 185 via the end of the sensor, as described with respect to the first embodiment of FIG. 2, or an aperture must be formed in the sensor housing, for example as described with respect to the third embodiment of FIG. 10.

Figure 7:
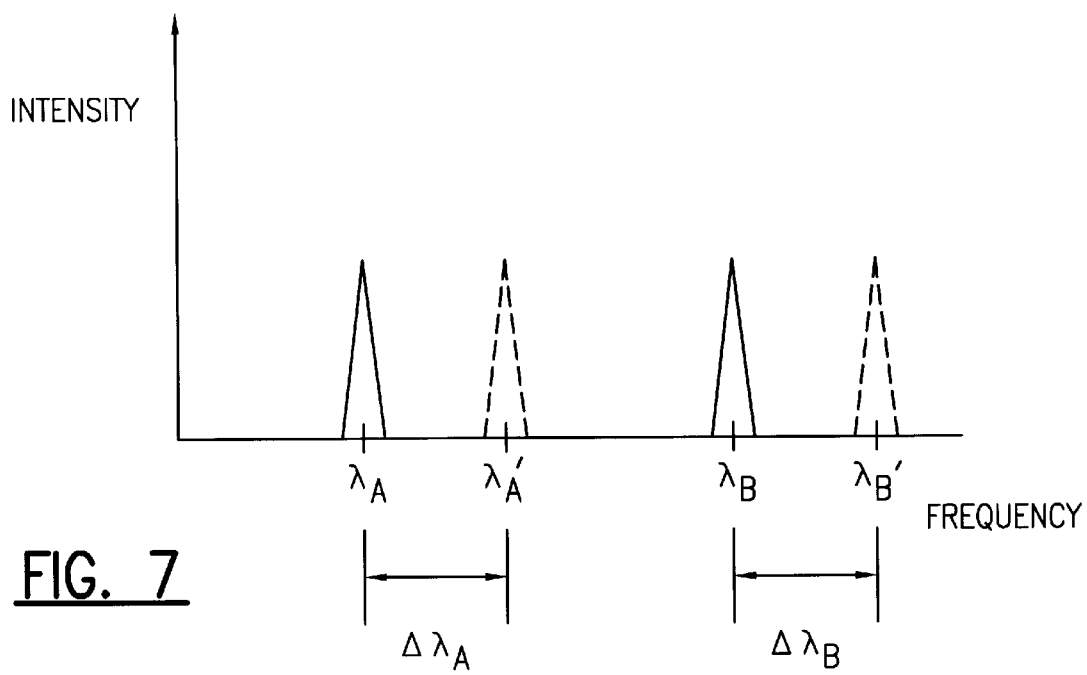
FIGS. 7 and 8 are a graphs showing the reflectivity profile of Bragg gratings used in the fiber optic intrinsic sensor of FIG. 6 showing the responsiveness of the sensors to changes in temperature and pressure.

When the position of the bellows structure 185 changes due to a change of the pressure in the environment, the strain in the two Bragg gratings change in an equal but opposite amount. Referring also to FIG. 7, the central wavelength of the pressure sensing Bragg grating $\lambda_A$ and the temperature sensing Bragg grating $\lambda_B$ change by the same amount in response to a change in temperature with no change in pressure (no deflection of the dimensions of the bellows structure) as given by:

$$\Delta\lambda_A = \Delta\lambda_B$$

Figure 8:
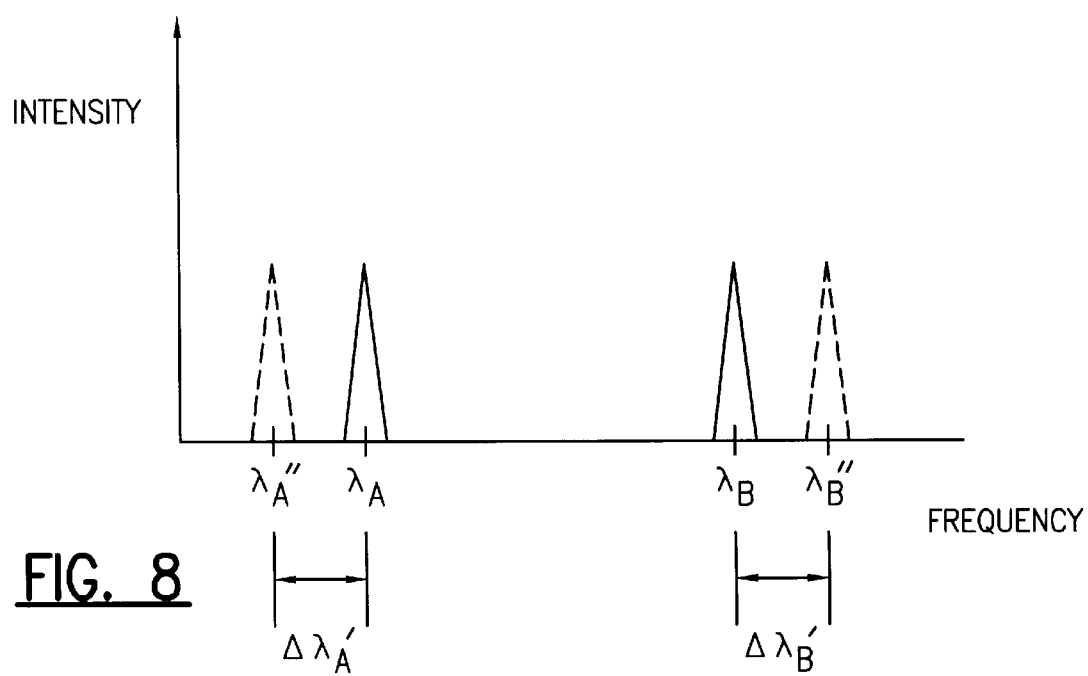

However, as illustrated in FIG. 8, the wavelength shift of the two Bragg grating sensors 147,148 is opposite for a change in pressure:

$$\Delta\lambda_A' = -(\Delta\lambda_B')$$

In particular, the difference between the wavelength of the two Bragg grating sensors 147,148 will not change with temperature. Instead, the difference in the wavelength between the two Bragg grating sensors will only change due to pressure (causing a deflection in the position of the bellows 185). This configuration provides the significant advantages of inherent temperature compensation and enhanced pressure sensing. When the change in central wavelength for the two Bragg grating sensors are subtracted from one another, the temperature component is canceled. However, the pressure component, being equal and opposite, is doubled. Therefore, the system provides twice the wavelength shift for a given pressure change as compared to a sensor using a single Bragg grating.

In the second embodiment of the invention of FIG. 6, the Bragg grating sensors 147,148 are described as having an equal and opposite change in strain associated with change in pressure (causing a shift in the position of the bellows structure 185). This assumes that both Bragg gratings 147, 148 are in a similar prestrain, neutral strain or compression condition and that the sensors operate generally linearly with changes in strain. However, if the Bragg grating sensors 147,148 do not respond linearly over the desired operating region, the response of the Bragg gratings 147,148 can be characterized to thereby provide the desired temperature compensated pressure sensing in accordance with the invention.

Figure 9:
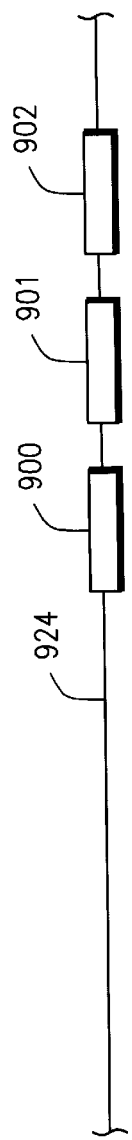
FIG. 9 is a schematic block diagram showing a plurality of a third embodiment of the fiber optic intrinsic sensor of FIG. 1 multiplexed together in a distributed pressure sensor.
Figure 10:
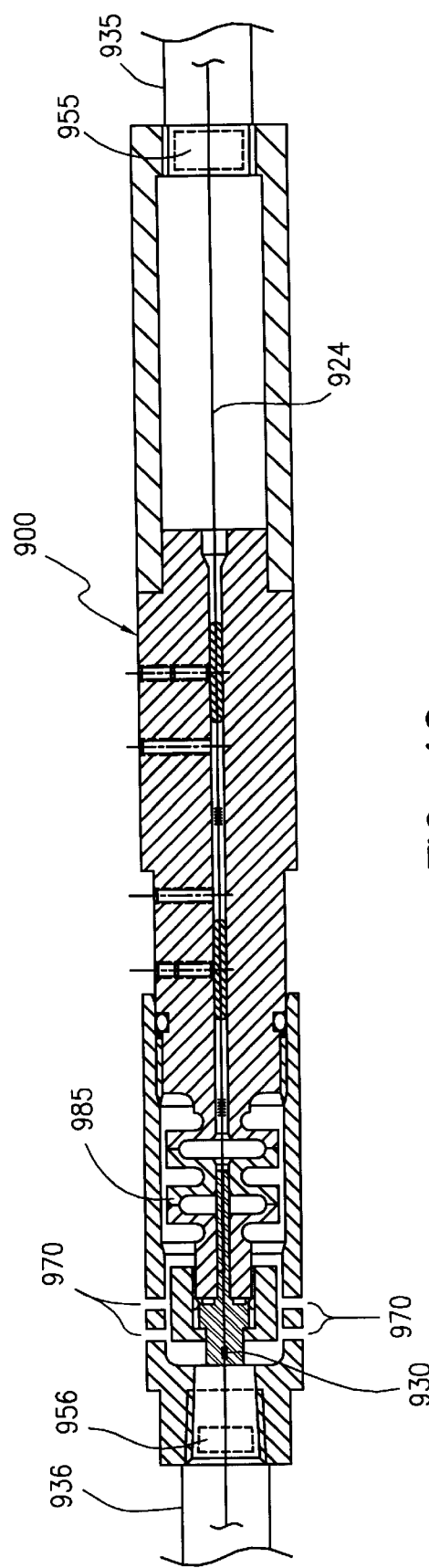
FIG. 10 is a more detailed schematic block diagram of the fiber optic intrinsic sensor of FIG. 9.

The invention has been described thus far as providing a single point temperature compensated pressure sensor. However, multiple pressure sensors constructed in accordance with the teachings of the invention may be multiplexed together to provide distributed pressure sensing. Referring to FIG. 9, multiple pressure sensors 900, 901, 902 may be multiplexed together over a single optical fiber 924. Referring to FIG. 10, one of the pressure sensors 900 is shown. This sensor is of the same basic structure as the pressure senor 1 illustrated in FIG. 2. However, rather than terminating in a ferrule at the end of the bellows structure, the optical fiber 924 passes through a fitting 930 at the end of the bellows structure 985 for interconnection to the next pressure sensor 901. Both ends of the sensor 900 are interconnected to lengths of capillary tubing 935,936 to protect the optical fiber 924 along its length. The capillary tubing 935,936 may be connected to the sensor 900 by threads, welding, etc. for a secure, leak tight seal. When entering and exiting the capillary tubing 935, 936 on the ends of the sensor 900, the sensor is provided with pressure seals 955,956 to isolate the capillary tubes from the pressure sensor. Apertures 970 are provided in the sensor housing adjacent to the bellows structure 985 such that the bellows structure is exposed to the pressure in the environment.

The various pressure and temperature signals from the different sensors 900, 901, 902 may be differentiated from one another using wavelength division multiplexing techniques. For example, as described with respect to FIG. 5, each Bragg grating is designed to operate at a central wavelength λ within a bandwidth ω that does not overlap with the bandwidth of the other Bragg grating sensors. Therefore, the temperature and pressure signals from each of the sensors 900,901,902 can be easily differentiated from one another based on the received wavelength. Alternatively, time division multiplexing techniques may be utilized to differentiate between signals from different Bragg grating sensors. As is known in the art, this well known technique is based on the position of each sensor along the length of the optical fiber 924 and the sequence that reflected signals will be received from each of the sensors.

The multiplexed sensors 900, 901,902 of FIG. 9 may be of the type illustrated in FIG. 2, using an isolated temperature compensation Bragg grating sensor. Alternatively, the multiplexed sensors may be of the design illustrated in FIG. 6. In this case, the fixed reference location may be part of a pressure seal that isolates the pressure sensor from the capillary tube 936.

In addition to the use of a single reflective grating as a Bragg grating sensor as explained herein, an alternate embodiment of this invention can utilize a pair of reflective gratings within the same length of fiber, thus forming a resonant cavity of longer length. Such a resonant cavity will also reflect light of a particular wavelength corresponding to a central wavelength of the reflective gratings A change in the cavity length due to a static strain, a dynamic strain and/or a temperature induced strain on fiber will result in phase shift in the reflected light due to the change in optical path length within the reflective cavity. Such a device, termed a Fabry-Perot interferometer, can then provide a high sensitivity means of detecting strain in the optical fiber, and the resultant optical phase shift can be detected using standard interferometer instrumentation techniques. Thus, it is possible with this technique to realize a Bragg grating sensor which has enhanced sensitivity. Alternatively, the pair of Bragg gratings may be used to form a lasing element for detection for example by positioning an Erbium doped length of optical fiber between the pair of Bragg gratings.

Although the invention has been described and illustrated with respect to exemplary embodiments thereof, the foregoing and various other additions and omissions may be made therein and thereto without departing from the spirit and scope of the present invention.

We claim:

1. A pressure sensor for sensing pressure in an environment, comprising:

a pressure sensitive structure having at least one dimension that changes in response to changes in the pressure of the environment;

an optical fiber mounted to said pressure sensor at a first mounting location having a position that does not change with changes in the pressure of the environment and mounted to said pressure sensitive structure at a second mounting location spaced from said first mounting location, said second mounting location having a position that changes with changes in said at least one dimension; and Bragg grating sensing means, positioned within said optical fiber between said first and second mounting locations, responsive to an optical signal and to a strain associated with changes in said second mounting location position for providing an optical sensing signal containing information about and used to determine the pressure of the environment sensed by the pressure sensitive structure.

2. A pressure sensor according to claim 1, wherein said pressure sensitive structure includes a pressure responsive bellows structure, and wherein said at least one dimension is the axial length of said bellows structure.

3. A pressure sensor according to claim 1, wherein said pressure sensor further includes temperature compensation means responsive to a temperature of said environment for providing a temperature compensation optical signal.

4. A pressure sensor according to claim 3, wherein said temperature compensation means includes a temperature compensation Bragg grating sensing means responsive to said optical signal and to a strain associated with the temperature of the environment for providing a temperature compensation optical sensing signal related to the temperature of the environment.

5. A pressure sensor according to claim 4, wherein said temperature compensation Bragg grating sensing means is mounted within said pressure sensor such that it is isolated from strain associated with pressure in the environment.

6. A pressure sensor according to claim 3, wherein said temperature compensation means includes temperature compensation Bragg grating sensing means, positioned within said optical fiber between third and fourth mounting locations, said third mounting location having a position that does not change with changes in the pressure of the environment and said fourth mounting location being mounted to said pressure sensitive structure at a location spaced from said third mounting location, said fourth mounting location having a position that changes with changes in said at least one dimension in an inverse sense with respect to said Bragg grating sensing means.

7. A pressure sensor according to claim 6, wherein when said at least one dimension changes in response to changes in the pressure of the environment, the strain in said temperature compensation Bragg grating changes in an equal but opposite amount to the strain in said Bragg grating sensing means.

8. A pressure sensor according to claim 1, wherein said Bragg grating sensing means is mounted under an initial compression, and wherein changes in said at least dimension causes changes in said initial compression.

9. A pressure sensor according to claim 1, wherein said Bragg grating sensing means is mounted under an initial tension, and wherein changes in said at least dimension causes changes in said initial tension.

10. A distributed pressure sensor system for sensing pressure at a plurality of locations in an environment, comprising:
 a light source for providing an input optical signal;
 an optical fiber coupled to said light source;
 a plurality of pressure sensors, each pressure sensor having:
  (a) a pressure sensitive structure having at least one dimension that changes in response to changes in the pressure of the environment;
  (b) a length of said optical fiber mounted in said pressure sensor at a first mounting location having a position that does not change with changes in the pressure of the environment and mounted to said pressure sensitive structure at a second mounting location spaced from said first mounting location, said second mounting location having a position that changes with changes in said at least one dimension; and
  (c) Bragg grating sensing means, positioned within said length of said optical fiber between said first and second mounting locations, responsive to said input optical signal and to a strain associated with changes in said second mounting location position for providing an optical sensing signal containing information about and used to determine the pressure of the environment sensed by the pressure sensitive structure.

11. A distributed pressure sensor system according to claim 10, wherein said pressure sensitive structure in each pressure sensor includes a pressure responsive bellows structure, and wherein said at least one dimension is the axial length of said bellows structure.

12. A distributed pressure sensor system according to claim 10, wherein each pressure sensor further includes temperature compensation means responsive to a temperature of said environment for providing a temperature compensation optical signal.

13. A distributed pressure sensor system according to claim 12, wherein said temperature compensation means in each sensor includes a temperature compensation Bragg grating sensing means formed in said optical fiber in each pressure sensor, said temperature compensation Bragg grating sensing means in each respective sensor being responsive to said input optical signal and to a strain associated with the temperature of said respective sensor in the environment for providing a temperature compensation optical sensing signal related to the temperature of said respective sensor in the environment.

14. A distributed pressure sensor system according to claim 13, wherein said temperature compensation Bragg grating sensing means is mounted within each pressure sensor such that it is isolated from strain associated with pressure in the environment.

15. A distributed pressure sensor system according to claim 12, wherein said temperature compensation means within each sensor includes temperature compensation Bragg grating sensing means, positioned within said optical fiber between third and fourth mounting locations, said third mounting location having a position that does not change with changes in the pressure of the environment and said fourth mounting location being mounted to said pressure sensitive structure at a location spaced from said third mounting location, said fourth mounting location having a position that changes with changes in said at least one dimension in an inverse sense with respect to said Bragg grating sensing means.

16. A distributed pressure sensor system according to claim 15, wherein when said at least one dimension changes in response to changes in the pressure of the environment, the strain in said temperature compensation Bragg grating changes in an equal but opposite amount to the strain in said Bragg grating sensing means.

17. A distributed pressure sensor system according to claim 10, wherein said Bragg grating sensing means in each sensor is mounted under an initial compression, and wherein changes in said at least dimension causes changes in said initial compression.

18. A distributed pressure sensor system according to claim 10, wherein said Bragg grating sensing means in each sensor is mounted under an initial tension, and wherein changes in said at least dimension causes changes in said initial tension.

19. A distributed pressure sensor system according to claim 10, further comprising fiber carrier means, said optical fiber being positioned within said fiber carrier means.

20. A distributed pressure sensor system according to claim 19, wherein said fiber carrier means is interconnected to each of said sensors.

21. A distributed pressure sensor system according to claim 20, wherein said fiber carrier means is a plurality of lengths of capillary tubing.

22. A distributed pressure sensor system according to claim 19, wherein said fiber carrier means includes a coating material surrounding the optical fiber.

23. A distributed pressure sensor system according to claim 10, wherein time division multiplexing (TDM) is used to differentiate between said optical sensing signals from different ones of said Bragg grating sensing means.

24. A distributed pressure sensor system according to claim 10, wherein each one of said Bragg grating sensing means has a respective bandwidth tuned to reflect a respective bandwidth of light, the respective bandwidth for each Bragg grating sensing means having a respective central wavelength, said respective central wavelength being different for each Bragg grating sensing means.

25. A distributed pressure sensor system according to claim 24, wherein wavelength division multiplexing (WDM) is used to differentiate between said optical sensing signals from different ones of said Bragg grating sensing means.

26. A distributed pressure sensor system according to claim 24, wherein time division multiplexing (TDM) and wavelength division multiplexing (WDM) is used to differentiate between said optical sensing signals from different ones of said Bragg grating sensing means.

27. A temperature compensated pressure sensor for sensing pressure in an environment, comprising:
 a pressure sensitive structure having at least one dimension that changes in response to changes in the pressure of the environment;
 an optical fiber mounted to said pressure sensor between a first mounting location and a second mounting location spaced apart from said first mounting location, both said first and second mounting locations having positions that do not change with changes in the pressure of the environment, said optical fiber also being mounted to said pressure sensitive structure at a third mounting location between said first and second mounting location, said third mounting location having a position that changes with changes in said at least one dimension;

a first Bragg grating sensor element positioned within said optical fiber between said first and third mounting locations; and a second Bragg grating sensor element positioned within said optical fiber between said second and third mounting locations;

said first and second Bragg grating sensor elements being responsive to an input optical signal and to a strain associated with changes in said second mounting location position for respectively providing a first optical sensing signal having a first wavelength and second optical sensing signal having a second wavelength, the difference between said first and second wavelengths containing information about and used to determine the pressure of the environment sensed by the pressure sensitive structure.

28. A pressure sensor according to claim 27, wherein said pressure sensitive structure includes a pressure responsive bellows structure, and wherein said at least one dimension is the axial length of said bellows structure.

29. A pressure sensor according to claim 27, wherein when said at least one dimension changes in response to changes in the pressure of the environment, the strain in said first and second Bragg grating sensor elements change in equal but opposite amounts.

30. A pressure sensor according to claim 27, wherein said first and second Bragg grating sensor elements are mounted under an initial compression, and wherein changes in said at least dimension causes equal and opposite changes in said initial compression for said first and second Bragg grating sensor elements.

31. A pressure sensor according to claim 27, wherein said first and second Bragg grating sensor elements are mounted under an initial tension, and wherein changes in said at least one dimension causes equal and opposite changes in said initial tension for said first and second Bragg grating sensor elements.

32. A high sensitivity fiber optic pressure sensor for sensing a pressure in a harsh environment, comprising:

a pressure sensitive bellows structure having a first mounting location and being responsive to a pressure in a harsh environment, for providing a pressure sensitive bellows structure force containing information about the pressure in the harsh environment;

a section having a second mounting location and being unresponsive to the pressure in the harsh environment; and a fiber having a fiber Bragg Grating, being coupled between the first mounting location and the second mounting location, responsive to the pressure sensitive bellows structure force, and further responsive to an optical signal, for providing a fiber Bragg Grating optical signal containing information about the pressure sensitive bellows structure force sensed by the pressure sensitive structure and being used to determine the pressure in the harsh environment.

33. A high sensitivity fiber optic pressure sensor according to claim 32, wherein the pressure sensitive bellows structure includes a pressure responsive multielement bellows.

34. A high sensitivity fiber optic pressure sensor according to claim 33, wherein the pressure responsive multielement bellows is made from machined titanium.

35. A high sensitivity fiber optic pressure sensor according to claim 32, wherein the fiber Bragg Grating is pretensioned between the first mounting location and the second mounting location.

36. A high sensitivity fiber optic pressure sensor according to claim 32, wherein the section is a temperature compensation structure having a fiber Bragg Grating that does not respond to the pressure in a harsh environment, but instead responds to a temperature of the harsh environment, and further responds to the optical signal, for providing a fiber Bragg Grating temperature compensation optical signal containing information about the temperature of the harsh environment.

* * * * *

UNITED STATES PATENT AND TRADEMARK OFFICE
CERTIFICATE OF CORRECTION

PATENT NO : 6,016,702            Page 1 of 2
DATED : January 25, 2000
INVENTOR(S): Maron It is certified that error appears in the above-identified patent and that said Letters Patent is hereby corrected as shown below:

Title page, item [56], under "Foreign Patent Document" list --95 30926 11/1995 WO--.

Title page, item [56] under "Other Publications", line 3, delete "Senosr" and insert --Sensor--.

In column 2, line 17, after "environment" insert --.--.

In column 3, line 7, "BraC,C" should be --Bragg--.

In column 5, line 51, "hitch" should be --high--.

In column 6, line 9, "mounting, structure" should be --mounting structure--.

In column 9, line 66, "chances" should be --changes--.

In column 11, line 54, "gratings" should be --gratings.--.

UNITED STATES PATENT AND TRADEMARK OFFICE
CERTIFICATE OF CORRECTION

PATENT NO. : 6,016,702
DATED : January 25, 2000
INVENTOR(S) : Maron

It is certified that error appears in the above-identified patent and that said Letters Patent is hereby corrected as shown below:

In column 11, line 66, "detection for example" should be --detection, for example--.

Signed and Sealed this

Sixth Day of March, 2001

Attest:

NICHOLAS P. GODICI

Attesting Officer  Acting Director of the United States Patent and Trademark Office